US007930224B2

(12) United States Patent
Chang et al.

(10) Patent No.: US 7,930,224 B2
(45) Date of Patent: Apr. 19, 2011

(54) SYSTEM AND METHOD FOR PREDICTING PROFIT LEAKAGE

(75) Inventors: Hung-Yang Chang, Scarsdale, NY (US); Jun-Jang Jeng, Armonk, NY (US); Christian A. Lang, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/048,698

(22) Filed: Mar. 14, 2008

(65) Prior Publication Data
US 2009/0234758 A1    Sep. 17, 2009

(51) Int. Cl.
*A01K 5/02* (2006.01)
*G06F 17/50* (2006.01)

(52) U.S. Cl. ............. 705/29; 705/35; 705/36 R; 705/30; 705/39; 706/12; 706/52; 706/21

(58) Field of Classification Search ....... 707/2, E17.131; 706/52, 12, 47, 20; 705/30, 8, 20, 39, 36 R
See application file for complete search history.

(56) References Cited

U.S. PATENT DOCUMENTS

| | | | | |
|---|---|---|---|---|
| 5,696,907 | A * | 12/1997 | Tom ............................... | 705/38 |
| 6,119,103 | A * | 9/2000 | Basch et al. ..................... | 705/35 |
| 6,456,983 | B1 * | 9/2002 | Keyes et al. ................ | 705/36 R |
| 7,113,932 | B2 * | 9/2006 | Tayebnejad et al. ............. | 706/21 |
| 7,191,150 | B1 * | 3/2007 | Shao et al. ...................... | 705/38 |
| 7,254,558 | B2 * | 8/2007 | Hinkle et al. .................... | 705/40 |
| 7,346,594 | B2 * | 3/2008 | Ricketts ........................... | 706/12 |
| 7,403,931 | B2 * | 7/2008 | Tayebnejad et al. ............. | 706/21 |
| 7,461,034 | B2 * | 12/2008 | Ricketts ........................... | 706/12 |
| 7,483,865 | B2 * | 1/2009 | Ricketts ........................... | 706/12 |
| 7,610,257 | B1 * | 10/2009 | Abrahams ........................ | 706/62 |
| 2002/0116245 | A1 * | 8/2002 | Hinkle et al. ..................... | 705/8 |
| 2002/0161731 | A1 * | 10/2002 | Tayebnejad et al. ............. | 706/20 |
| 2002/0194117 | A1 * | 12/2002 | Nabe et al. ....................... | 705/38 |
| 2003/0187708 | A1 * | 10/2003 | Baydar et al. ...................... | 705/7 |
| 2004/0039593 | A1 * | 2/2004 | Eskandari .......................... | 705/1 |
| 2004/0128236 | A1 * | 7/2004 | Brown et al. .................... | 705/39 |
| 2004/0186765 | A1 * | 9/2004 | Kataoka ........................... | 705/10 |
| 2005/0027572 | A1 * | 2/2005 | Goshert ............................. | 705/4 |
| 2005/0080821 | A1 * | 4/2005 | Breil et al. .................. | 707/104.1 |
| 2007/0112697 | A1 * | 5/2007 | Ricketts ........................... | 706/12 |
| 2008/0065579 | A1 * | 3/2008 | Ricketts ........................... | 706/47 |
| 2008/0071707 | A1 * | 3/2008 | Ricketts ........................... | 706/12 |
| 2008/0147438 | A1 * | 6/2008 | Kil ..................................... | 705/2 |
| 2008/0147441 | A1 * | 6/2008 | Kil ..................................... | 705/2 |
| 2008/0281770 | A1 * | 11/2008 | Ricketts ........................... | 706/52 |
| 2009/0043643 | A1 * | 2/2009 | Kitamura et al. ............... | 705/10 |
| 2009/0063311 | A1 * | 3/2009 | Allison et al. ................... | 705/30 |
| 2009/0138433 | A1 * | 5/2009 | Reid .................................. | 707/2 |
| 2009/0234758 | A1 * | 9/2009 | Chang et al. .................... | 705/30 |

\* cited by examiner

*Primary Examiner* — Matthew S Gart
*Assistant Examiner* — Olusegun Goyea
(74) *Attorney, Agent, or Firm* — Stephen Bongini; Fleit Gibbons Gutman Bongini & Bianco PL

(57) ABSTRACT

A method, information processing system, and computer readable storage medium manage and predict profit leakage. A dynamic deduction space is created that includes a plurality of dimensions associated with historical deduction data and profit leakage information associated with a combination of two or more of the dimensions. Information associated with an open deduction is received. A dimension set in the deduction space is identified that corresponds to the open deduction. A profit leakage classification is assigned to the open deduction based on profit leakage information associated with the dimension set.

20 Claims, 12 Drawing Sheets

SYSTEM AND METHOD FOR PREDICTING PROFIT LEAKAGE

FIELD OF THE INVENTION

The present invention generally relates to the field of business accounting, and more particularly relates to systems and methods for predicting profit leakage.

BACKGROUND OF THE INVENTION

Profit leakage during deduction processing is typically due to two issues: aging deductions and write-off deadlines. Deductions age because there are typically more open deductions than can be processed and resolved. Also, deduction resolution includes many non-deterministic steps (e.g., waiting for a customer response) that can lengthen the processing. Write-off deadlines are used to ensure that deductions (especially small deductions) do not use up unnecessary and expensive resources by being open for too long. Together, these two issues can lead to write-offs of many small invalid deductions, which in sum can constitute a large profit leakage.

In deduction processing, not every deduction is equal. Some deductions have a higher chance to miss the write-off deadline than others and therefore should be assigned a higher priority assigned. This "danger of deadline overrun" depends on factors such as the type of customer (small or large, region, etc.), the reason for the deduction (delivery problem, missing discount, etc.), and the observed interaction pattern with the customer (request followed by two days waiting followed by another request followed by five days waiting, etc.).

In current deduction management systems, a leakage prediction is generally not taken into account in the decision making process. Instead, simple heuristics are employed, such as focusing on the largest deductions first. In U.S. Patent Application Publication No. 2002/0194117, which is herein incorporated by reference in its entirety, a system for predicting future customer behavior based on customer behavior/spending is disclosed. The system is directed to generating customer campaigns for load products. This is achieved via mining of historic customer transactions and model building. However, one problem with such a system is that incremental refinement of predictions (such as by using a multi-dimensional "cube" model) is not performed so predictions do not become more accurate over time.

In U.S. Patent Application Publication No. 2003/0187708, which is herein incorporated by reference in its entirety, a system for improving the performance of retail stores is disclosed. This system provides dynamic pricing based on customer models that are derived from historic transaction data. One problem with such a system is that it is restricted to retail or a specific prediction (e.g., pricing). Also, such a system also does not provide incremental refinement of predictions (such as by using a multi-dimensional "cube" model).

In U.S. Patent Application Publication No. 2004/0039593, which is herein incorporated by reference in its entirety, a system for analyzing customer attrition is disclosed. This system builds data models to predict customer churn based on customer information. One problem with such a system is that it does not take temporal attributes into account. Consequently, there is also no incremental prediction refinement. Also, such a system does not address incremental model updates and is restricted to predicting churn.

SUMMARY OF THE INVENTION

Briefly, in accordance with the present invention, disclosed is a method for managing and predicting profit leakage. A dynamic deduction space is created that includes a plurality of dimensions associated with historical deduction data and profit leakage information associated with a combination of two or more of the dimensions. Information associated with an open deduction is received. A dimension set in the deduction space is identified that corresponds to the open deduction. A profit leakage classification is assigned to the open deduction based on profit leakage information associated with the dimension set.

In another embodiment, an information processing system for managing and predicting profit leakage is disclosed. The information processing system includes a memory and a processor that is communicatively coupled to the memory. A profit leakage management system is communicatively coupled to the memory and the processor. The profit leakage management system is adapted to create a dynamic deduction space that includes a plurality of dimensions associated with historical deduction data and profit leakage information associated with a combination of two or more of the dimensions. Information associated with an open deduction is received. A dimension set in the deduction space is identified that corresponds to the open deduction. A profit leakage classification is assigned to the open deduction based on profit leakage information associated with the dimension set.

In yet another embodiment, a computer readable storage medium for managing and predicting profit leakage is disclosed. The computer readable storage medium includes instructions for creating a dynamic deduction space that includes a plurality of dimensions associated with historical deduction data and profit leakage information associated with a combination of two or more of the dimensions. Information associated with an open deduction is received. A dimension set in the deduction space is identified that corresponds to the open deduction. A profit leakage classification is assigned to the open deduction based on profit leakage information associated with the dimension set.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION

Embodiments of the present invention incorporate static customer information and dynamic process execution information that is changing over time into a profit leakage prediction. This provides better guidance in decision making for deduction management. As more information becomes available, incremental refinement of predictions is performed so that the profit leakage prediction becomes more accurate over time. Some embodiments of the present invention also incrementally alter the classification space by comparing predictions with real outcomes.

Profit Leakage Management System

Figure 1:
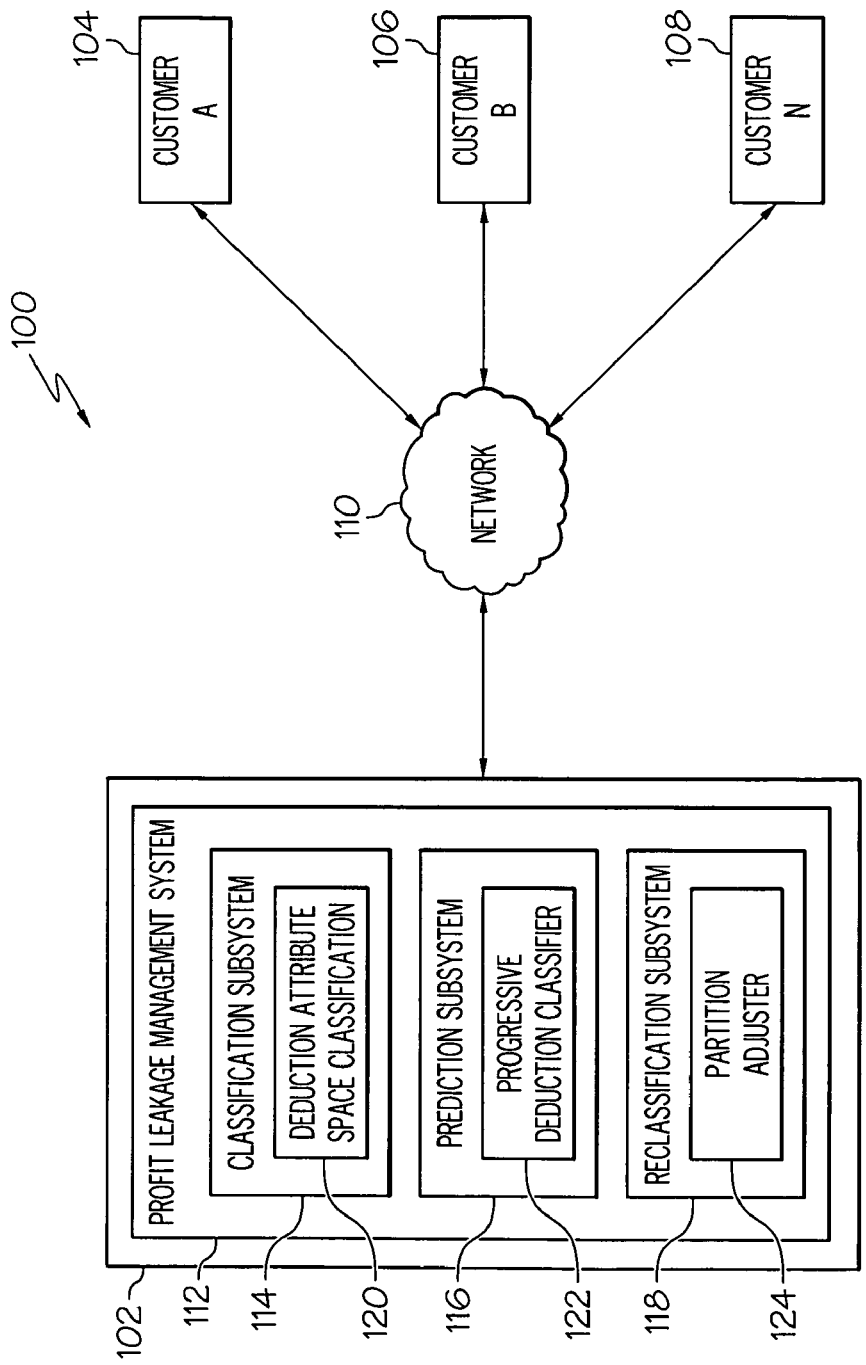
FIG. 1 is a block diagram illustrating an overall system for managing profit leakage according to a preferred embodiment of the present invention.

FIG. 1 shows a system 100 for managing profit leakage according to a preferred embodiment of the present invention. As shown, one or more information processing systems 102 are utilized for business processes associated with processing of orders, sending invoices, receiving payment, applying cash, and other accounting/inventory processes. Alternatively, the information processing system 102 can be communicatively coupled to one or more other information processing systems that perform one or more of these accounting/inventory processes.

In this embodiment, the information processing system 102 is communicatively coupled to customers 104, 106, and 108 via a network 110. The customers 104, 106, and 108 purchase products and/or services from the business associated with the information processing system 102. The network 110, in this embodiment, is one or more Local Area Networks, Wide Area Networks, wired networks, wireless networks, Public Switched Telephone Networks, or a combination thereof.

The information processing system 102 includes a profit leakage management system 112. The profit leakage management system 112 integrates with accounting/inventory processes of the business for resolving invoice deductions taken by the customers 104, 106, and 108. Currently, resolving such deductions is a very time and labor consuming manual process. If processing an invoice takes up too much time, it typically gets closed and the outstanding money written off. If the deduction was not valid, this is lost profit, or "profit leakage", for the seller. The profit management system 112 manages and predicts the danger of profit leakage. This prediction can happen before or during the execution of the deduction resolution process, as discussed below. The profit leakage management system 112 of this embodiment incorporates static customer information and dynamic process execution information that changes over time into the profit leakage prediction.

In this embodiment, the profit leakage management system 112 includes various subsystems that interact through an iterative feedback mechanism to provide continuously refined predictions of leakage. The continuous refinement, in this embodiment, takes place both within a deduction (e.g., while more and more information and customer interaction is observed) as well as across deductions (e.g., rules learned from past deductions can help future deduction cases). In this embodiment, the various subsystem include (but are not limited to) a classification subsystem 114, a prediction subsystem 116, and a reclassification subsystem 118. The classification subsystem 114 includes, among other things, a deduction attribute space classifier 120 that creates an initial classification of the deduction space (i.e., the space of all deductions). This space may have many dimensions, such as deduction amount, payment terms, customer attributes, customer interaction pattern, and the like. The deduction attribute space classifier 120 uses past deduction cases and industry benchmarks as input to classify the space.

The prediction subsystem 116 includes, among other things, a progressive deduction classifier 122 that uses the space classification (of the deduction attribute space classifier 120) in order to predict how likely the current deduction case is to lead to profit leakage. The progressive deduction classifier 122 does this by continuously observing customer interaction patterns and deduction information. Any changes in these may lead to a change or refinement in the prediction based on the space classification, and thus to a prediction with less error. This prediction can then be observed by a human or can be used to automatically change parts of the process flow.

The reclassification subsystem 118, among other things, includes a partition adjuster 124. The partition adjuster 124 dynamically changes the space classification by enlarging, shrinking, splitting, or combining partitions based on the observed behavior patterns, deduction information, and outcome (with regard to leakage). The partition adjuster 124 can take into account both the currently observed case as well as historic (i.e., already closed) cases. By adjusting the space classification, better predictions can be achieved across deductions.

An overview of the profit leakage management and predication process is as follows. An initial deduction space classification is created. For example, a set of attributes/dimensions are determined. Each dimensioned is divided into distinct values/value ranges. A value combination $(a_1, \ldots, a_n)$ is selected to assign a classification. The classification for $(a_1, \ldots, a_n)$ is then determined and stored (e.g., via benchmarks or majority in historic deduction traces). If there are additional value combinations to be processed they are selected for assigning a classification as discussed above.

Continuing with the overview, the system waits for a new deduction D. When the new deduction D is detected, a progressive classification for D is performed. Leakage is then predicted and various actions are performed. If the deduction is determined to be closed, the prediction is stored in a prediction history storage and partitioning of the deduction space is adjusted. If the deduction is not closed, then the progressive classification of D is continued. The partitioning of the deduction space can be performed as follows. The system determines if there is a high variance (as determined by inspecting historic deductions) in the classification for any attribute $(a_1, \ldots, a_n)$ in the deduction space classification. If there is, then one of the dimensions $(a_1, \ldots, a_n)$ is split such that variance is reduced.

If there a high variance does not exist then the system determines if there is low variance (as determined by inspecting historic deductions) in the classification for neighboring attribute combinations. If low variance does exist, then the system combines neighboring cells in one dimension to form new cell that is bigger and includes "coarser" attribute values. The above processes are discussed in greater detail below.

Profit Leakage Management and Prediction

Figure 2:
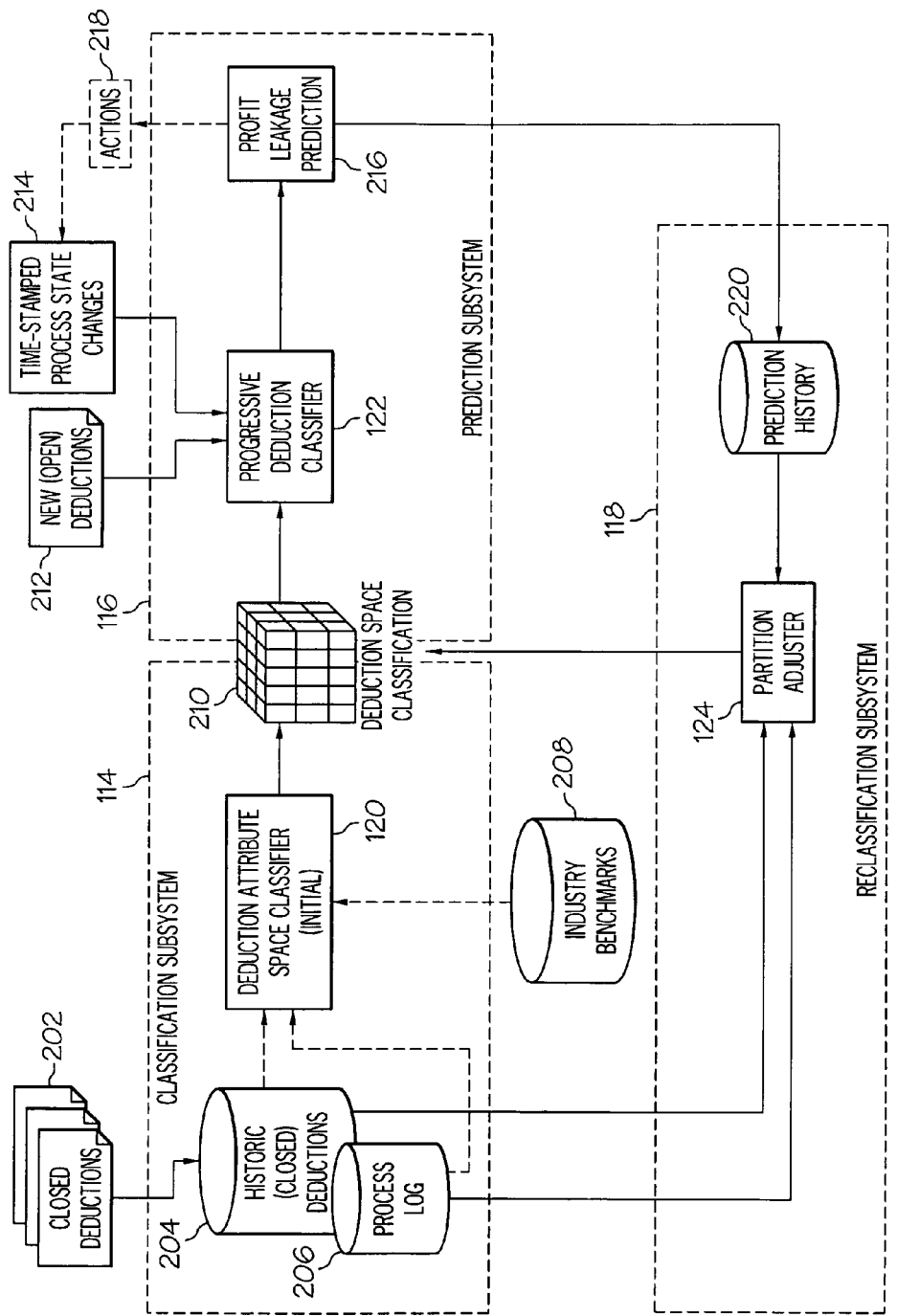
FIG. 2 is a block diagram illustrating a detailed view of a profit leakage management system according to one embodiment of the present invention.

FIG. 2 is a block diagram illustrating a detailed view of a profit leakage management system for classifying deductions with respect to their leakage risk according to one embodiment of the present invention. In this embodiment, the classification subsystem 114 utilizes closed deductions 202, which can date back many years, and stores them in a format such as (but not limited to) relational tables. These stored closed deductions are known as "historic deductions" 204. One example of historic (closed) deductions is given below with respect to FIG. 6. Process execution traces ("process logs") 206 are also stored and made available to the classification subsystem 114. The process logs 206 of this embodiment include interaction data with respect to customers and customer behavior. For example, a business may request information from a customer with respect to a deduction, contact attempt information, customer response information, and other such information.

The classification subsystem 114 of this embodiment takes the historic deduction information 204, process logs 206, industry benchmarks 208 on profit leakage, or a combination thereof into account to determine a classification of the deduction attribute space 210 into low to high leakage risk categories. In this embodiment, this process is performed by the deduction attribute space classifier 120, which is discussed in greater detail below. The deduction attribute space 210 includes one or more attributes describing deduction-related static properties, such as (but not limited to) associated customer, amount, season, and deduction type properties, and temporal properties such as (but not limited to) the process log associated with the deduction. The deduction attribute space classification 210 can be stored in various formats such as (but not limited to) a data cube, flat and a table.

The prediction subsystem 116 utilizes the attribute space classification 210 for classifying new (open) deductions 212 and for progressively refining the classification when the deduction process progresses. The classification of this embodiment is performed by the progressive deduction classifier 122, which is discussed in greater detail below. The predicted classification 216 of a deduction is given as a set or range of leakage risk such as (but not limited to) potential leakage risk is "HIGH" or "MEDIUM-HIGH".

This prediction can then be used to re-rank open deductions 212 in order to consider high-leakage risk deductions before deductions with lower risk (e.g., HIGH/MEDIUM risk ranked lower than HIGH/MEDIUM-HIGH risk). The prediction can also be used to directly or indirectly (via human interaction) lead to actions 218 that, in turn, influence the deduction process state changes. In this embodiment, the progressive deduction classifier 122, profit leakage predictor 216, actions 218, and process state changes form a feedback loop that leads to a continuous refinement of the leakage prediction 216 over the lifetime of one deduction.

In this embodiment, historic predictions are stored in a data store 220 together with their associated deduction. The reclassification subsystem 118 of this embodiment uses the historic prediction data store 220 and associated deduction information such as (but not limited to) deduction attributes along with the prediction history information in the data store 220 to adjust the deduction space classification. This adjusting process is performed by the partition adjuster 124, which is discussed in greater detail below.

Figure 3:
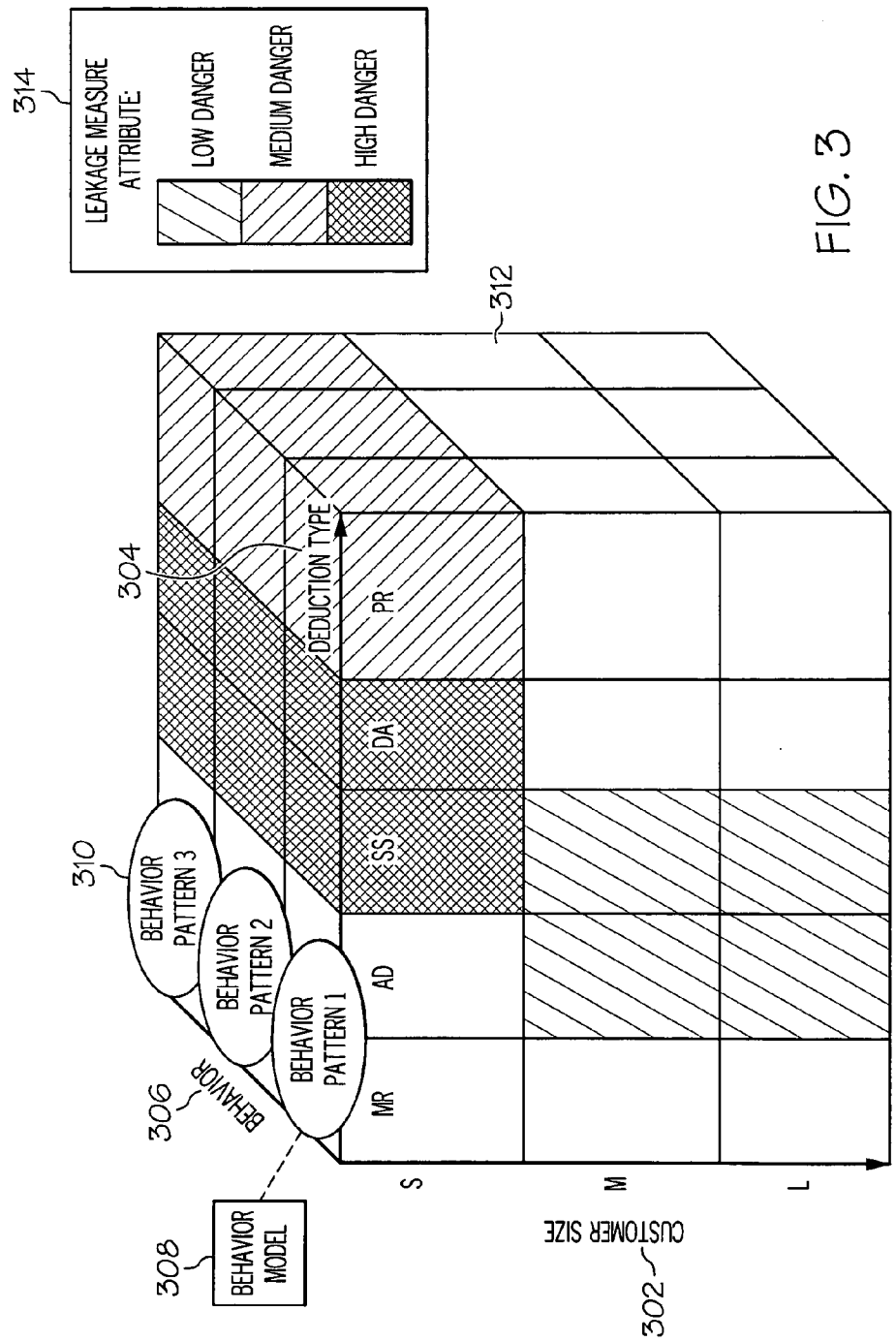
FIG. 3 illustrates a deduction space classifier according to one embodiment of the present invention.

FIG. 3 illustrates one example of a deduction attribute space classification as determined by the deduction attribute space classifier. The deduction attribute space classifier 120, in this example, establishes an initial classification of the deduction space. The deduction attribute space classifier 120 connects to an industry benchmark store 208 to establish industry-wide averages for profit leakage for a given combination of deduction attributes such as (but not limited to) date, amount, and customer size. The leakage averages are added conceptually as a measure attribute to the closed deductions data store 204.

In addition, the deduction attribute space classifier 120 takes into account the process logs 206 associated with closed deductions if the benchmark store can distinguish different processes. In an embodiment in which a benchmark store is unavailable, the leakage measure attribute can be set to the assumed fraction of deductions that were not paid by the customer but should have been paid. For example, in a situation in which a customer in January deducted $500 because of a short shipment and 30% of the deductions are finally paid by the customer and the fraction of unpaid deductions that should have been paid is assumed to be 40%, the leakage measure for this category in this example is (100%−30%) *40%=28%.

Each dimension of the deduction attribute space classifier 120 corresponds to one deduction attribute. In the example in FIG. 3 there are three dimensions: customer size 302, deduction type 304, and customer behavior or interaction pattern 306. The deduction attribute space classifier 120 has the option of taking into account a temporal dimension such as a customer interaction pattern (depending on whether it was available in the industry benchmark store). The behavior dimension comprises one or more behavior models or process execution models 308. Each behavior of the process execution models 308 represents a distinct behavioral or process execution pattern 310 such as (but not limited to) "frequent escalation" and "customer XYZ response pattern for short shipments". The shading of each cell 312 represents the measure attribute value such as (but not limited to) expected profit leakage danger. In the example of FIG. 3, three levels 314 of leakage danger are shown: low, medium, and high.

The deduction attribute space classifier 120 in this example starts with an initial set of values per dimension. For example, the customer size dimension 302 has the values "S", "M", and "L". Similarly, the deduction type dimension 304 in this example has five values. The temporal dimension(s) 306 may have one or more values that are described as behavior (or temporal) models. These models can be built in different ways using, for example, hidden Markov models built from process logs 206. In this embodiment, it is assumed that each model receives subsequent observed changes in the process state and uses these to indicate the likelihood that it matches the observed pattern so far. It is further assumed that each model can be "split" into two or more models if the model is not discriminative enough. For example, a model for "frequent escalation" can be split into a model for "weekly escalation" and "monthly escalation". Similarly, it is assumed that models can be combined again if certain models become rarely activated.

Once the initial set of values per dimension is determined, the deduction attribute space classifier 120 fills the cells 3 with the leakage prediction for the combination of attribute values corresponding to each cell. For example, a particular cell can represent the combination customer size M, deduction type PR and behavior pattern 3. As discussed above, the predictions are taken from industry benchmarks 208 and/or historic logs 204. If the leakage for a cell 210 is not known, it can be initialized with some default value.

Figure 4A:
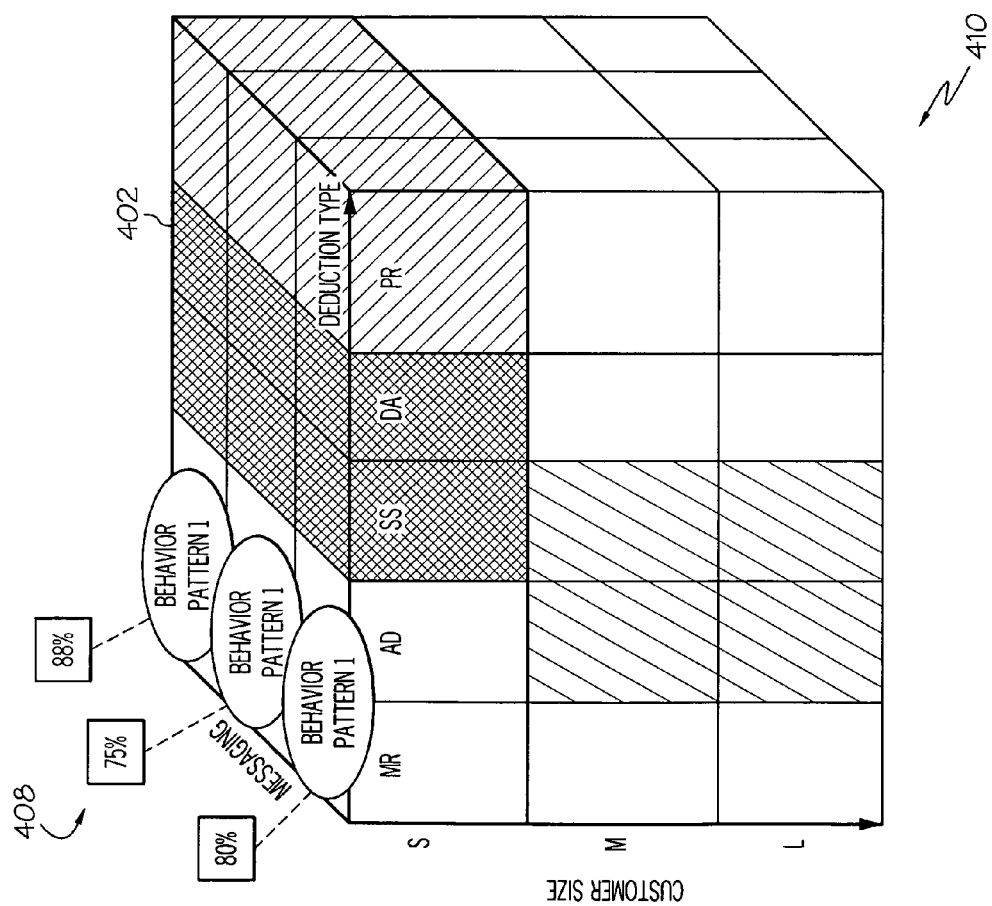
FIG. 4A-4C illustrates a progressive deduction classifier according to one embodiment of the present invention.
Figure 4B:
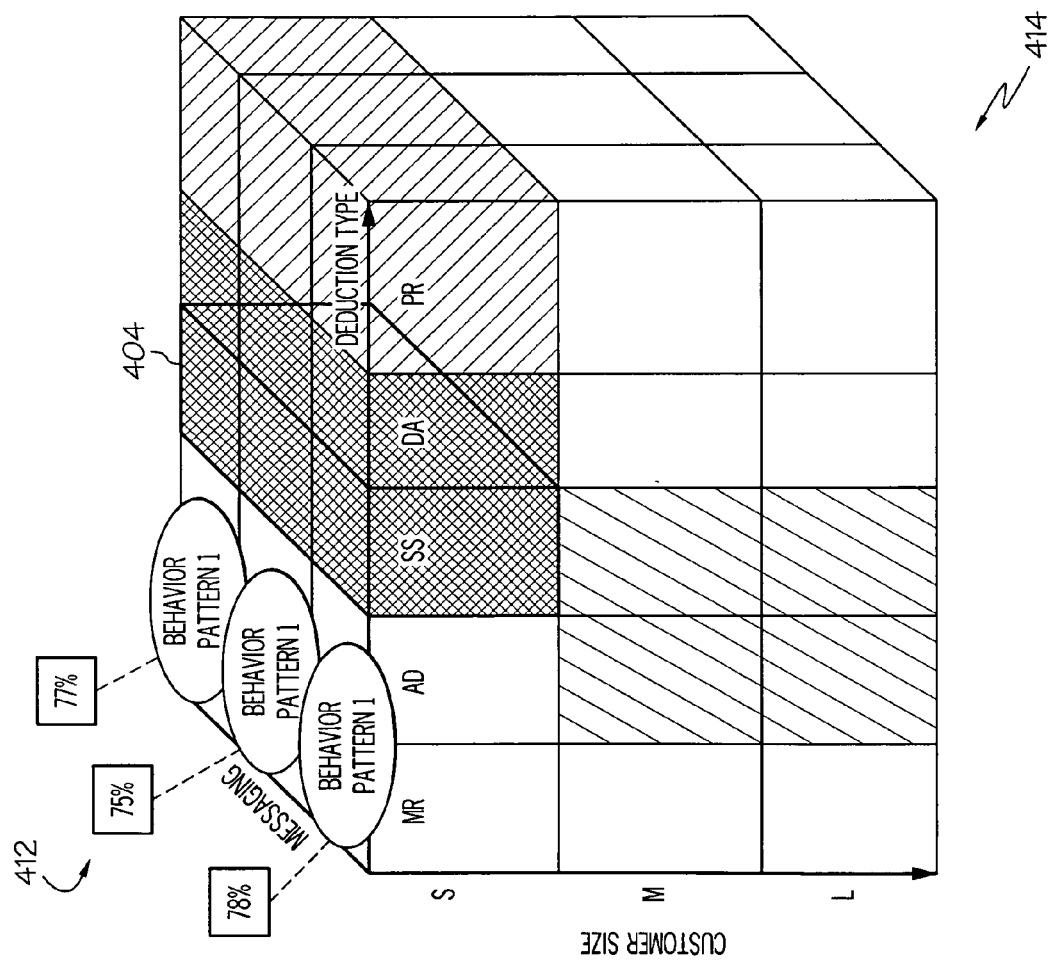
Figure 4C:
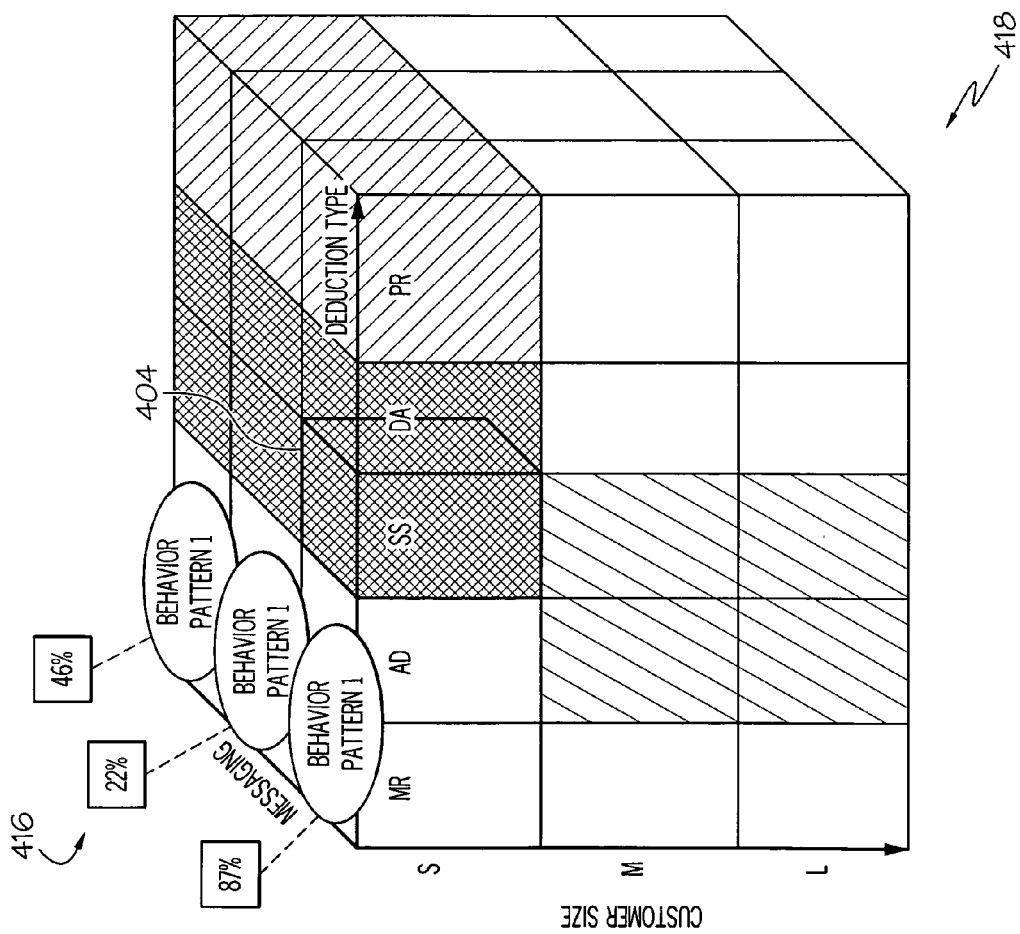

FIGS. 4A-4C illustrate one example for progressive leakage prediction using the deduction attribute space classification. Given a deduction attribute space classifier 120, a deduction space classification 210 can be generated for the purposes of prediction. For a new incoming deduction 212, the progressive deduction classifier 122 progressively determines which attribute combinations are known about the deduction 402, 404, and 406, as shown by the dashed lines in each of the cubes. At first, only the size of the customer issuing the deduction may be known, e.g. S 410. The other attributes can still be any value. The resulting space of possible attribute combinations is shown by box 402.

For this first step, the potential leakage 408 is computed by determining the cells with the minimum and maximum leakages in the dashed line space 402. Additionally, if weights are available on cells or rows, these may be taken into account as well. In a second step 412 of this example, the deduction operator determines that the reason for the deduction was a short shipment "SS" 414. Therefore, the area of possible attribute combinations shrinks further as does the leakage prediction as shown by box 404. Up to the second step 412, all behavior models show a high likelihood of matching the observed process log behavior. In the third step 416, further process steps are taken. Now, only one model matches the observed log with high likelihood (87%), while the other models are below the likelihood threshold and are now considered "inactive" 418. Thus, the box and the predicted leakage interval shrink further, which is now down to a single value (shown by box 406).

In summary, with progressing deduction process states, the area of possible deduction attributes keeps shrinking and with it the predicted leakage interval. This interval can either be shown to the operator to aid in deciding on the important deductions or it can be used to automatically re-prioritize deduction cases. The models have the ability to predict which process steps may follow given an observed sequence. This ability can be used to weight other behavior patterns and thus further improve the prediction intervals.

At a high level, predicting the attribute values for a deduction is as follows.

```
for each dimension d,
    determine subset s_d of attribute values that apply to
    current deduction; // If the dimension d is a temporal dimension, then
        "apply" means the temporal model recognizes the
        behavior pattern with high likelihood.
end for
Pred := { }
for each cell c in deduction space partition
    add_cell := true;
    for each dimension d
        if d^th attribute of c is not contained in s_d
            then add_cell := false;
    end for
    if (add_cell = true)
        then add the cell's prediction to Pred
end for
return Pred
```

Figure 5A:
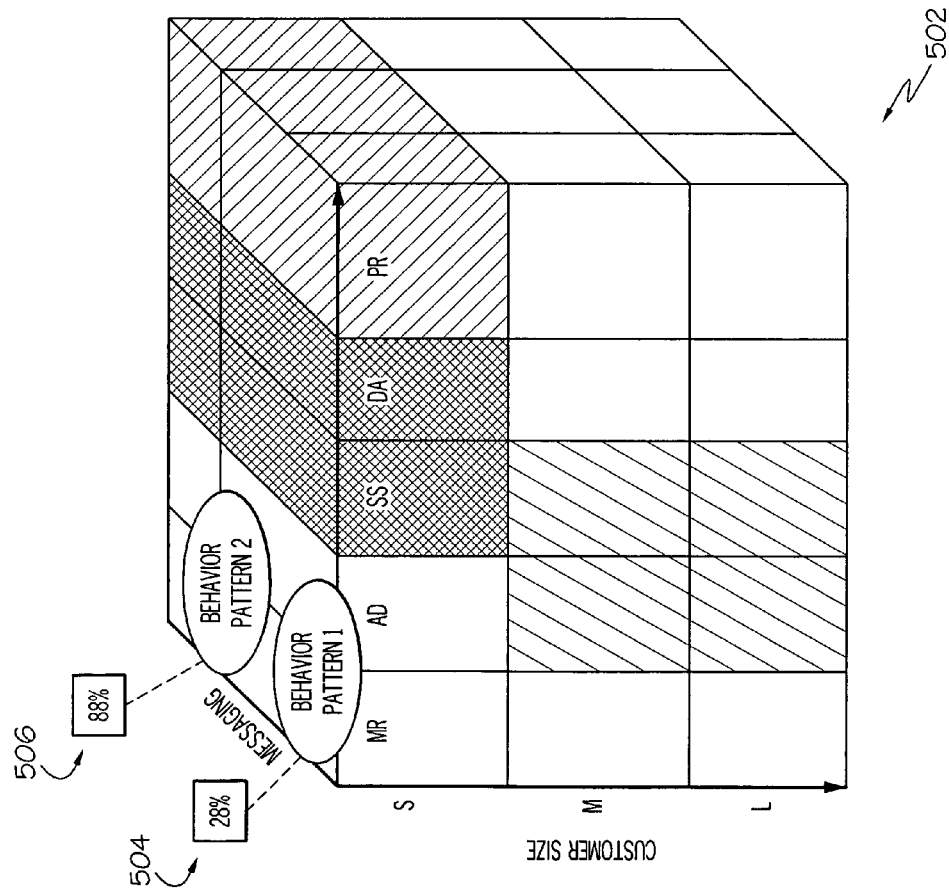
FIGS. 5A-5B illustrates a partition adjuster according to one embodiment of the present invention.
Figure 5B:
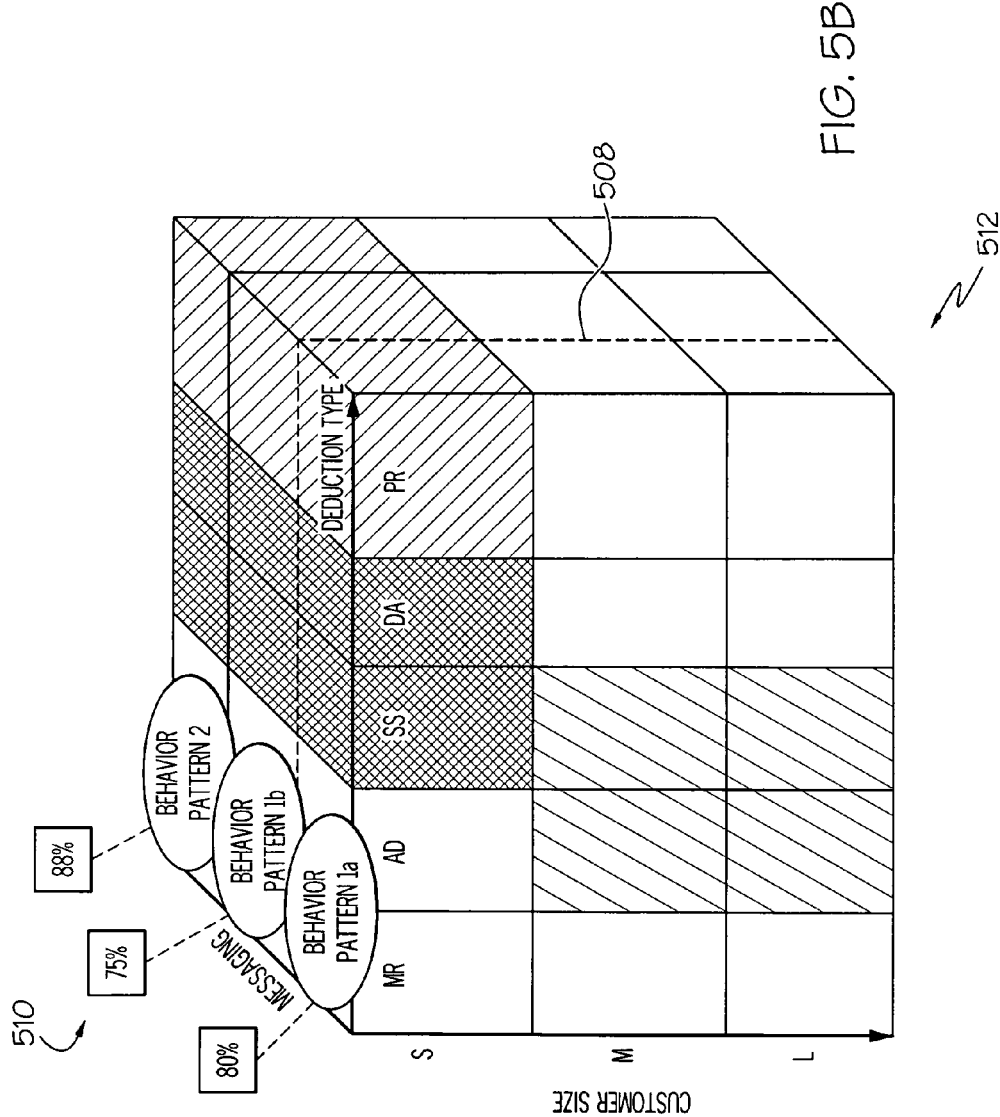

FIGS. 5A-5B illustrate one example for continuous refinement of the deduction attribute space classification. The partition adjuster 124, in this embodiment, continuously inspects the historic deductions 204 within the attributes and process logs 206 and the current leakage prediction model and evaluates if the model needs refinement or if it can be made broader. With respect to the first cube 502 in the example of FIG. 5, the model shown by the black lines 504 is not sufficient because from historic logs, it turns out that there are cases in S-size businesses with PR-type deduction that lead to higher leakage for certain behavior patterns 506. The partition adjuster 124, therefore, splits the model 504 for "behavior pattern 1" into two models "1a" and "1b" as shown by the dotted lines 508. The partition adjuster 124 copies substantially all prediction values between the split cells except for the one that shows a change in leakage (size S, type PR). This cell is split and one cell (associated with behavior 1b) is assigned the original (low) leakage, while the other (behavior 1a) is assigned the observed higher leakage.

Then there are three new classifications 510 in the attribute space on the right 512. Similarly, if over time two neighboring cell rows show very similar leakage, they can be combined into a single row by combining the behavior models. Besides splitting/combining the process log dimension, similar splitting/combining is possible between the other dimensions, though it is mainly useful for value types. Besides the splitting/combining of dimensions, the partition adjuster 124 can also simply "re-color" cells based on observed leakage. Thus, the leakage model evolves over time, starting from an initial model, and potentially changing with every observed deduction case.

Accordingly, the various embodiments of the present invention discussed above are advantageous because they incorporate (static) customer information and (dynamic) process execution information that is changing over time into a profit leakage prediction. This provides better guidance in decision making for deduction management. Also, the various embodiments of the present invention perform incremental refinement of predictions based a multi-dimensional "cube" model. As more information becomes available, the profit leakage prediction becomes more accurate over time. The various embodiments of the present invention can also incrementally alter the classification "cube" by comparing predictions with real outcomes. Finally, the cube combines both temporal and non-temporal data in a single model.

Figure 6:
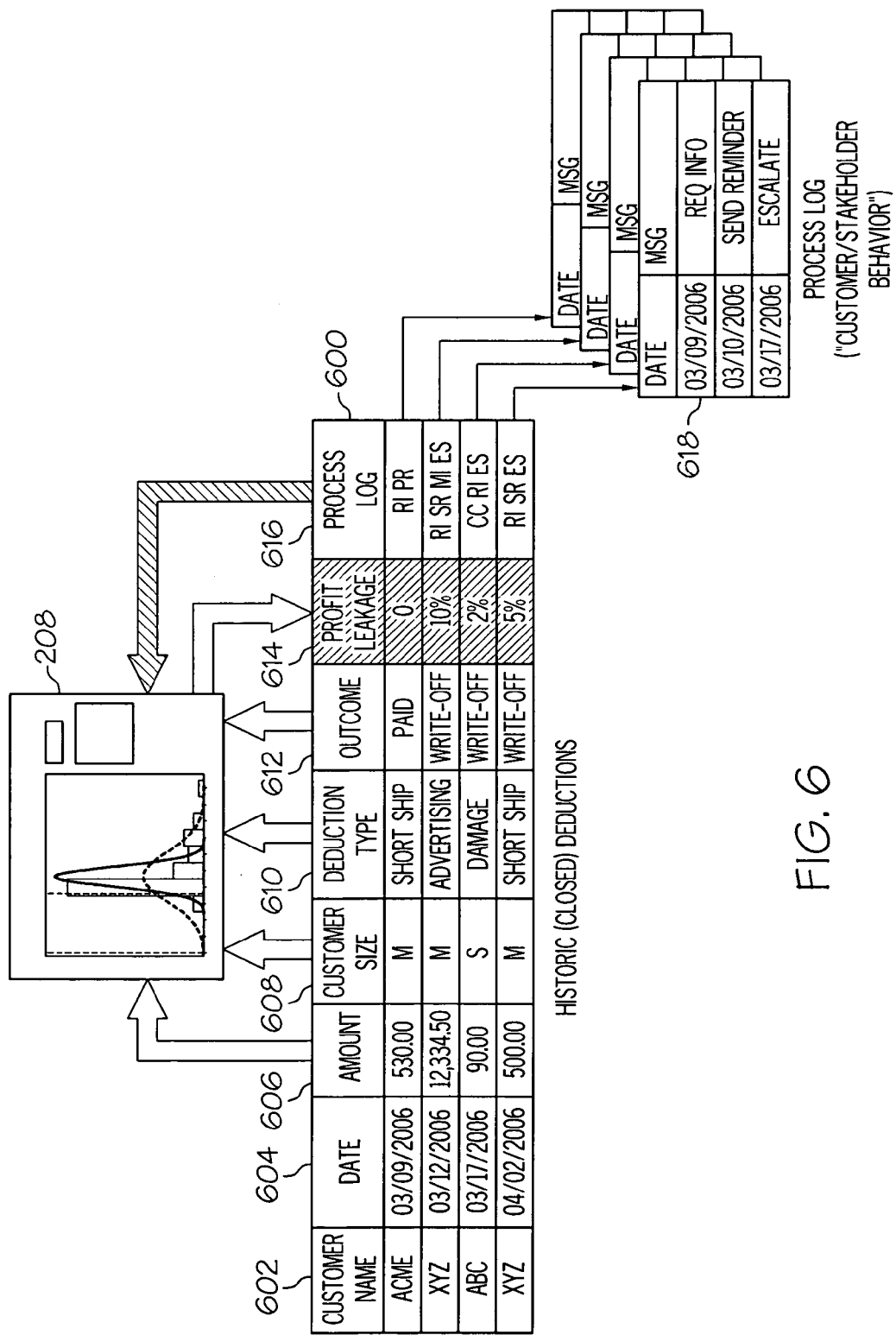
FIG. 6 illustrates an example of historic deductions with assigned profit leakage information according to one embodiment of the present invention.

FIG. 6 illustrates one example of historic deductions with assigned profit leakage information as determined by the deduction attribute space classifier. In particular, FIG. 6 shows a table 600 comprising information associated with multiple customers. The exemplary table 600 comprises a "Customer Name" column 602 including customer identifying information; a "Date" column 604 including the date a customer took a deduction; an "Amount" column 606 indicating how much of a deduction a customer took; a "Customer Size" column 608 indicating the size of the customer; a "Deduction Type" column, 610 indicating the type of deduction taken by a customer such as (but not limited to) short ship, advertising, and damage; an "Outcome" column indicating how the deduction was resolved; a "Profit Leakage" column 614 indicating the determined profit leakage associated with a deduction; and a "Process Log" column 616 indicating the various processes taken with respect to resolving the deductions.

FIG. 6 also shows an exemplary table 618 containing process log data. In this example, table 618 shows that on Mar. 9, 2006 a request for information was sent to customer XYZ. The deduction attribute space classifier 120, in the example of FIG. 6, utilizes industry benchmark information 208 along with deduction amount 606, customer size 608, deduction type 610, outcome 612, and process log information 616 to determine a predicted profit leakage for a deduction taken by a customer. For example, FIG. 6 shows that for customer Acme, the profit leakage is 0 because the customer paid the deduction. However, the deduction taken by customer XYZ on Mar. 12, 2006 was written off and has a 10% profit leakage. As discussed above, the profit leakage predictions can by dynamically adjusted based on historic information and process logs (e.g., customer paid all or part of the deduction).

Figure 7:
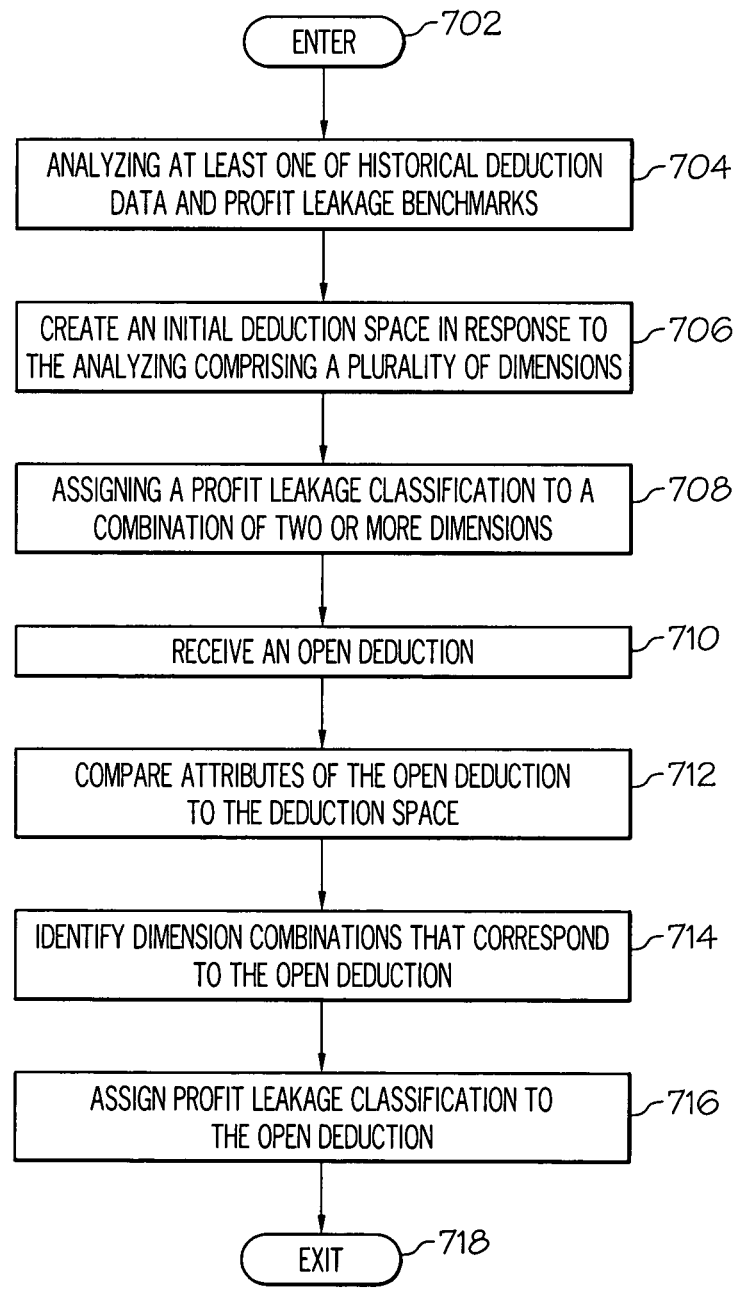
FIG. 7 is an operational flow diagram illustrating a process for predicting profit leakage according to one embodiment of the present invention.

FIG. 7 is an operational flow diagram illustrating a process for predicting profit leakage for a deduction according to one embodiment of the present invention. The operational flow diagram begins at step 702 and flows directly to step 704. The profit leakage management system 112, at step 704, analyzes at least one of historical deduction data and profit leakage benchmarks. The profit leakage management system 112, at step 706, creates an initial classification of the deduction space in response to this analysis. The initial deduction space includes multiple dimensions such as deduction amount, payment terms, customer attributes, customer interaction patterns, and other dimensions related to customers and/or deductions.

A profit leakage classification, at step 708, is then assigned to a combination of two or more of the dimensions. A profit classification can be any classification mechanism, such as a percentage or a category (such as "High" or "Low"). The profit leakage management system 112, at step 710, receives an open deduction, and then compares it to the deduction classification space at step 712. The profit leakage management system 112, at step 714, identifies dimension combinations within the deduction classification space that correspond to the open deduction. The profit leakage management system 112, at step 716, then assigns a profit leakage classification to the open deduction. The control flow then exits at step 718.

Figure 8:
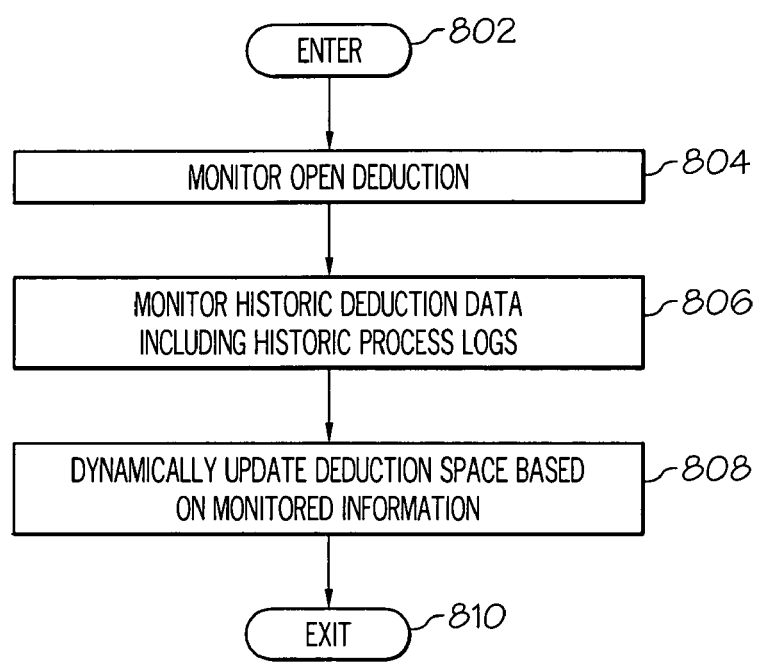
FIG. 8 is an operational flow diagram illustrating a process for dynamically updating the deduction classification space according to one embodiment of the present invention.

FIG. 8 is an operational flow diagram illustrating a process for dynamically updating the deduction classification space according to one embodiment of the present invention. The operational flow diagram begins at step 802 and flows directly to step 804. The profit leakage management system 112, at step 804, monitors information associated with an open deduction such as (but not limited to) customer interaction patterns and outcome of a deduction event. The profit leakage management system 112, at step 806, also monitors historic deduction data including process logs. For example, in some embodiments the historic data store and process logs are constantly updated. Therefore, this data store changes over time. The profit leakage management system 112, at step 808, based on the monitored data dynamically updates the deduction classification information. For example, the profit leakage management system 112 can enlarge, shrink, split, or combine partitions within the deduction space. The profit leakage management system 112 can also adjust the profit leakage assignments and values as well. The control low then exits at step 810.

Figure 9:
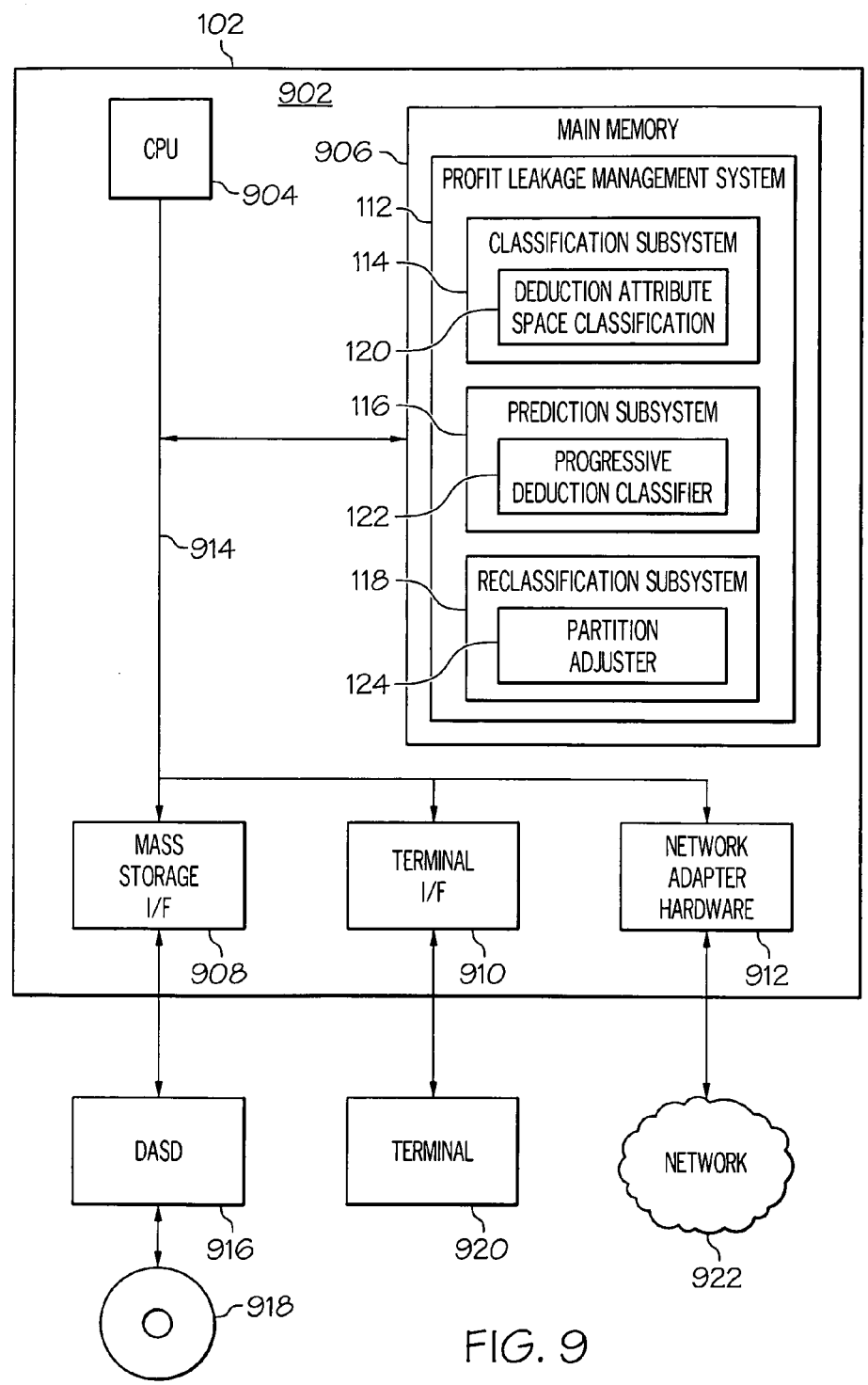
FIG. 9 is a block diagram illustrating an information processing system according to one embodiment of the present invention.

FIG. 9 is a block diagram illustrating an information processing system according to one embodiment of the present invention. The information processing system is based upon a suitably configured processing system adapted to implement an embodiment of the present invention. Any suitably configured processing system is similarly able to be used as the information processing system 102 by various embodiments of the present invention, such as an information processing system residing in the computing environment of FIG. 1, a personal computer, a workstation, or the like.

The information processing system 102 includes a computer 902. The computer 902 has a processor 904 that is connected to a main memory 906, mass storage interface 908, terminal interface 910, and network adapter hardware 912. A system bus 914 interconnects these system components. The mass storage interface 908 is used to connect mass storage devices, such as data storage device 916, to the information processing system 102. One specific type of data storage device is a computer readable medium such as a disk drive, which may be used to store data to and read data from a CD 918 or a floppy diskette. Another type of data storage device is a hard disk data storage device configured to support, for example, NTFS type file system operations.

The main memory 906, in this embodiment, contains the profit leakage management system 112. As discussed above, the profit leakage management system 112 includes the classification subsystem 114, prediction subsystem 116, reclassification subsystem 118, and their respective components. Although illustrated as concurrently resident in the main memory 906, it is clear that respective components of the main memory 906 are not required to be completely resident in the main memory 906 at all times or even at the same time. In this embodiment, the information processing system 102 utilizes conventional virtual addressing mechanisms to allow programs to behave as if they have access to a large, single storage entity, which is referred to herein as "computer system memory", instead of access to multiple, smaller storage entities such as the main memory 906 and data storage device 916. The "computer system memory" generically refers to the entire virtual memory of the information processing system 102.

Although only one CPU 904 is illustrated for computer 902, computer systems with multiple CPUs can be used equally effectively. Various embodiments of the present invention further incorporate interfaces that each includes separate, fully programmed microprocessors that are used to off-load processing from the CPU 904. Terminal interface 910 is used to directly connect one or more terminals 920 to computer 902 to provide a user interface to the computer 902. These terminals 920, which are able to be non-intelligent or fully programmable workstations, are used to allow system administrators and users to communicate with the information processing system 102. The terminal 920 is also able to consist of user interface and peripheral devices that are connected to computer 902 and controlled by terminal interface hardware included in the terminal I/F 910 that includes video adapters and interfaces for keyboards, pointing devices, and the like.

An operating system included in the main memory is a suitable multitasking operating system such as the Linux, UNIX, Windows, or Windows Server operating system. Embodiments of the present invention are able to use any other suitable operating system. Some embodiments of the present invention utilize architectures, such as an object oriented framework mechanism, that allows instructions of the components of operating system to be executed on any processor located within the information processing system 102. The network adapter hardware 912 is used to provide an interface to a network 922. Embodiments of the present invention are able to be adapted to work with any data communications connections including present day analog and/or digital techniques or via a future networking mechanism.

Although the exemplary embodiments of the present invention are described in the context of a fully functional computer system, further embodiments are capable of being distributed as a tangible computer program product, such as a CD, DVD, or other form of computer recordable and readable media.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A computer-implemented method for managing and predicting profit leakage, the method comprising the steps of:
creating a dynamic deduction space comprising a plurality of dimensions associated with historical deduction data and profit leakage information associated with a combination of two or more of the dimensions;
determining whether a high variance or a low variance exists between attributes of at least one of the dimensions;
in response to determining that a high variance exists, splitting the at least one dimension into at least two dimensions;
in response to determining that a low variance exists, combining at least two neighboring cells in the one dimension so as to form a new cell that is larger than each of the two neighboring cells, the new cell comprising coarser attribute values;
receiving information associated with an open deduction;
identifying a dimension set in the deduction space that corresponds to the open deduction;
determining, by a processor, a prediction of profit leakage associated with the dimension set that has been identified as corresponding to the open deduction; and
assigning a profit leakage prediction classification to the open deduction based on the prediction.

2. The method of claim 1, wherein the creating step comprises partitioning the deduction space into a plurality of deduction groups that each include substantially similar dimensions.

3. The method of claim 2, wherein the assigning step comprises assigning a profit leakage prediction classification to each of the deduction groups.

4. The method of claim 1, wherein one of the dimensions is associated with customer behavior with respect to a deduction.

5. The method of claim 1, wherein the creating step comprises analyzing at least one of a set of profit leakage benchmarks associated with the dimensions associated with historical deduction data and dynamic customer process logs comprising data associated with customer interaction and behavior with respect to a deduction.

6. The method of claim 1, further comprising the step of prioritizing the open deduction based on the profit leakage prediction classification assigned to the open deduction.

7. The method of claim 1, further comprising the steps of:
monitoring attribute data associated with a plurality of open deductions;
detecting changes to the historical deduction data; and
dynamically adjusting the deduction space in response to the changes to the historical data.

8. An information processing system adapted to manage and predict profit leakage, the information processing system comprising:
a memory;
a processor communicatively coupled to the memory; and
a profit leakage management system communicatively coupled to the memory and the processor, wherein the profit leakage management system is adapted to:
create a dynamic deduction space comprising a plurality of dimensions associated with historical deduction data and profit leakage information associated with a combination of two or more of the dimensions;
determine whether a high variance or a low variance exists between attributes of at least one of the dimensions;
in response to determining that a high variance exists, split the one dimension into at least two dimensions;
in response to determining that a low variance exists, combine at least two neighboring cells in the one dimension so as to form a new cell that is larger than each of the two neighboring cells, the new cell comprising coarser attribute values;
receive information associated with an open deduction;
identify a dimension set in the deduction space that corresponds to the open deduction;
determine a prediction of profit leakage associated with the dimension set that has been identified as corresponding to the open deduction; and
assign a profit leakage prediction classification to the open deduction based on the prediction.

9. The information processing system of claim 8, wherein the profit leakage management system is further adapted to create a dynamic deduction space by:
partitioning the deduction space into a plurality of deduction groups that each include substantially similar dimensions.

10. The information processing system of claim 9, wherein the profit leakage management system is further adapted to assign a profit leakage prediction classification by:
assigning a profit leakage prediction classification to each of the deduction groups.

11. The information processing system of claim 8, wherein one of the dimensions is associated with customer behavior with respect to a deduction.

12. The information processing system of claim 8, wherein the profit leakage management system is further adapted to create a dynamic deduction space by:
analyzing at least one of a set of profit leakage benchmarks associated with the dimensions associated with historical deduction data and dynamic customer process logs comprising data associated with customer interaction and behavior with respect to a deduction.

13. The information processing system of claim 8, wherein the profit leakage management system is further adapted to:
prioritize the open deduction based on the profit leakage prediction classification assigned to the open deduction.

14. The information processing system of claim 8, wherein the profit leakage management system is further adapted to:
monitor attribute data associated with a plurality of open deductions;
detect changes to the historical deduction data; and
dynamically adjust the deduction space in response to the changes to the historical data.

15. A non-transitory computer readable storage medium encoded with a program for managing and predicting profit leakage, the program comprising instructions for performing the steps of:
creating a dynamic deduction space comprising a plurality of dimensions associated with historical deduction data and profit leakage information associated with a combination of two or more of the dimensions;
determining whether a high variance or a low variance exists between attributes of at least one of the dimensions;
in response to determining that a high variance exists, splitting the at least one dimension into at least two dimensions;
in response to determining that a low variance exists, combining at least two neighboring cells in the one dimension so as to form a new cell that is larger than each of the two neighboring cells, the new cell comprising coarser attribute values;

receiving information associated with an open deduction;

identifying a dimension set in the deduction space that corresponds to the open deduction;

determining a prediction of profit leakage associated with the dimension set that has been identified as corresponding to the open deduction; and assigning a profit leakage prediction classification to the open deduction based on the prediction.

16. The non-transitory computer readable storage medium of claim 15, wherein the creating step comprises:

partitioning the deduction space into a plurality of deduction groups that each include substantially similar dimensions.

17. The non-transitory computer readable storage medium of claim 16, wherein assigning step comprises:

assigning a profit leakage prediction classification to each of the deduction groups.

18. The non-transitory computer readable storage medium of claim 15, wherein the creating step comprises:

analyzing at least one of a set of profit leakage benchmarks associated with the dimensions associated with historical deduction data and dynamic customer process logs comprising data associated with customer interaction and behavior with respect to a deduction.

19. The non-transitory computer readable storage medium of claim 15, further comprising instructions for performing the step of:

prioritizing the open deduction based on the profit leakage prediction classification assigned to the open deduction.

20. The non-transitory computer readable storage medium of claim 15, further comprising instructions for performing the steps of:

monitoring attribute data associated with a plurality of open deductions;

detecting changes to the historical deduction data; and dynamically adjusting the deduction space in response to the changes to the historical data.

* * * * *